United States Patent
Gerlach

(10) Patent No.: US 7,593,316 B2
(45) Date of Patent: Sep. 22, 2009

(54) METHOD FOR DISTRIBUTING DATA ON AN OFDM TIME-FREQUENCY GRID, A BASE TRANSCEIVER STATION, A BASE STATION CONTROLLER AND A MOBILE NETWORK THEREFOR

(75) Inventor: Christian Georg Gerlach, Ditzingen (DE)

(73) Assignee: Alcatel Lucent, Paris (FR)

( * ) Notice: Subject to any disclaimer, the term of this patent is extended or adjusted under 35 U.S.C. 154(b) by 563 days.

(21) Appl. No.: 11/356,165

(22) Filed: Feb. 17, 2006

(65) Prior Publication Data
US 2006/0209666 A1  Sep. 21, 2006

(30) Foreign Application Priority Data
Mar. 1, 2005 (EP) ................... 05004475

(51) Int. Cl.
*H04J 11/00* (2006.01)
(52) U.S. Cl. ............... 370/203; 370/208; 375/260
(58) Field of Classification Search ........... 370/203, 370/259–260; 455/403, 422.1, 450; 375/316, 375/346, 347
See application file for complete search history.

(56) References Cited

U.S. PATENT DOCUMENTS

| 2002/0147017 | A1 | 10/2002 | Li et al. | |
|---|---|---|---|---|
| 2003/0103445 | A1* | 6/2003 | Steer et al. | 370/208 |
| 2003/0169681 | A1 | 9/2003 | Li et al. | |
| 2004/0001429 | A1 | 1/2004 | Ma et al. | |
| 2004/0190640 | A1* | 9/2004 | Dubuc et al. | 375/260 |
| 2006/0025079 | A1* | 2/2006 | Sutskover et al. | 455/67.11 |
| 2007/0133386 | A1* | 6/2007 | Kim et al. | 370/203 |

FOREIGN PATENT DOCUMENTS

EP   1 526 674 A   4/2005

OTHER PUBLICATIONS

3GPP: "OFDM With Interference Control for Improved HSDPA Coverage," 3GPP TSG RAN WG1 Meeting #37, May 2004, pp. 1-11, XP002310556.

European Telecommunications Standards Institute, ETSI: "3$^{rd}$ Generation Partnership Project; Technical Specification Group Radio Access Network; Feasability Study for Orthogonal Frequency Division Multiplexing (OFDM) for UTRAN enhancement (Release 6)" 3GPP TR 25.892 V6.0.0, Jun. 1, 2004, XP002336544.

(Continued)

*Primary Examiner*—William Trost, IV
*Assistant Examiner*—Charles C Jiang
(74) *Attorney, Agent, or Firm*—Fay Sharpe LLP

(57) ABSTRACT

The invention concerns a method for distributing data on an OFDM time-frequency grid for data transmission from and to mobile terminals in a mobile network accommodating the use of pilot subgrids suitable for channel estimation, whereby said OFDM time-frequency grid comprises different frequency patterns, subcarrier frequencies of said different frequency patterns are interleaved, in at least one interleaving interval, as many cyclic shifts of the respective part of the frequency patterns are performed, rotating the allocation of the subcarrier frequencies to the different frequency patterns, as must be performed so that the distribution of the pilot subgrids over the frequency patterns leads for each pilot subgrid to no more than a maximum defined number of pilots that lie within each frequency pattern, a base transceiver station, a base station controller and a mobile network therefor.

14 Claims, 2 Drawing Sheets

OTHER PUBLICATIONS

Filed Feb. 17, 2006, entitled "A Method for Distributing Data on an OFDM Time-Frequency Grid Allowing for Coordination of Interferences and Adaptive Subcarrier Frequency Allocation, a Base Transceiver Station, a Base Station Controller and a Mobile Network Therefor."

* cited by examiner

METHOD FOR DISTRIBUTING DATA ON AN OFDM TIME-FREQUENCY GRID, A BASE TRANSCEIVER STATION, A BASE STATION CONTROLLER AND A MOBILE NETWORK THEREFOR

The invention is based on a priority application EP 05004475.9 which is hereby incorporated by reference.

FIELD OF THE INVENTION

The invention relates to a method for distributing data on an OFDM (OFDM=Orthogonal Frequency Division Multiplexing) time-frequency grid for data transmission from and to mobile terminals in a mobile network accommodating the use of pilot subgrids suitable for channel estimation wherein, said OFDM time-frequency grid comprises different frequency patterns, subcarrier frequencies of said different frequency patterns are interleaved, in at least one interleaving interval, as many cyclic shifts of the respective part of the frequency patterns are performed, rotating the allocation of the subcarrier frequencies to the different frequency patterns, as must be performed in order to achieve that the distribution of the pilot subgrids over the frequency patterns leads for each pilot subgrid to no more than a maximum defined number of pilots that lie within each frequency pattern, and said frequency patterns are allocated to mobile terminals, a base transceiver station comprising means for distributing data on an OFDM time-frequency grid for data transmission to mobile terminals in a mobile network accommodating the use of pilot subgrids suitable for channel estimation, wherein, subcarrier frequencies of different frequency patterns comprised in said OFDM time-frequency grid are interleaved, in at least one interleaving interval, as many cyclic shifts of the respective part of the frequency patterns are performed, rotating the allocation of the subcarrier frequencies to the different frequency patterns, as must be performed in order to achieve that the distribution of the pilot subgrids over the frequency patterns leads for each pilot subgrid to no more than a maximum defined number of pilots that lie within each frequency pattern, and said frequency patterns are allocated to mobile terminals, a base station controller for radio resource management in a mobile network, wherein the base station controller comprises means for allocating the new frequency patterns and/or the other frequency patterns according to claim 3 to the cells of the mobile network and a mobile network comprising mobile terminals, at least one base transceiver station comprising means for distributing data on an OFDM time-frequency grid for data transmission to mobile terminals in a mobile network accommodating the use of pilot subgrids suitable for channel estimation, wherein, subcarrier frequencies of different frequency patterns comprised in said OFDM time-frequency grid are interleaved, in at least one interleaving interval, as many cyclic shifts of the respective part of the frequency patterns are performed, rotating the allocation of the subcarrier frequencies to the different frequency patterns, as must be performed in order to achieve that the distribution of the pilot subgrids over the frequency patterns leads for each pilot subgrid to no more than a maximum defined number of pilots that lie within each frequency pattern, and said frequency patterns are allocated to mobile terminals and at least one base station controller for radio resource management in a mobile network, wherein the base station controller comprises means for allocating the new frequency patterns and/or the other frequency patterns according to claim 3 to the cells of the mobile network.

BACKGROUND OF THE INVENTION

OFDM air interfaces will become increasingly important e.g. for future evolutions of air interfaces in 3GPP Radio Access Networks, for Wireless Local Area Networks (WLANs) e.g. according to the IEEE 802.11a standard or for a $4^{th}$ generation air interface.

In OFDM transmission, frequency patterns are allocated to the mobile terminals. Up to now, different cells have different carrier frequencies or time-frequency patterns that are random like, so that no interference coordination between the cells is necessary or possible.

Given the licensed bandwidth, transmission capacity from network providers e.g. for WEB surfing or video streaming has to be as high as possible for all users to serve as many subscribers as possible. Further the quality of service experienced by the user and the coverage of the service is an important property demanded by the user. So OFDM transmission shall also work at the cell border.

A frequency re-use factor of 1 for the different cells and interference coordination shall be achieved for OFDM transmission in order to increase the utilization of the bandwidth without degradation of the quality of service caused by inter-cell interference.

In cellular systems with a frequency re-use factor of 1 the signal to interference ratio at the cell border approaches the factor 1 or 0 dB, so that no useful transmission from the base station to the mobile terminal can be kept up. Therefore in CDMA systems (CDMA=Code Division Multiple Access) soft handover was introduced using a different code from the neighboring cell in addition to the primary code from the serving cell. For packet transmission using High Speed Downlink Packet Access (HSDPA) no such solution is given reducing the coverage of HSDPA transmission to a fraction of the cell area.

In OFDM transmission, frequency patterns are allocated to a mobile terminal instead of codes in CDMA systems. In OFDM transmission, in contrast to CDMA transmission, interference can be planned and avoided. For OFDM transmission, which does not provide different scrambling codes for the different base stations, the problem at the cell border has to be solved as well. For that purpose frequency patterns are allocated to the users and the caused cross-cell interference can be coordinated.

For unsynchronized base stations, frequency patterns are searched that have frequency diversity to cope with the frequency selective channel transfer function, and the pilot subgrids of the OFDM time-frequency grid are used for channel estimation.

For the coordination of interference, the frequency patterns have to be the same in neighbor cells, while the pilot subgrid in neighbor cells shall be different to allow channel estimation also in the interference region. So, these frequency patterns have to be compatible with all possible pilot subgrids, meaning that the number of pilot hits i.e. stolen subcarrier frequencies by pilots needs to be independent of the pilot subgrid. Constructing then compatible patterns of low rate becomes a problem under these conditions. Distributing the subcarriers over the frequency axis and achieving compatibility with the pilot subgrid becomes difficult if the pilot distance is no prime number which it is usually not.

SUMMARY OF THE INVENTION

The object of the invention is to propose a method for distributing data for transmission on an OFDM time-frequency grid to eliminate the above mentioned shortcoming.

This object is achieved by a method for data transmission from and to mobile terminals in a mobile network accommodating the use of pilot subgrids suitable for channel estimation wherein, said OFDM time-frequency grid comprises different frequency patterns, subcarrier frequencies of said different frequency patterns are interleaved, in at least one interleaving interval, as many cyclic shifts of the respective part of the frequency patterns are performed, rotating the allocation of the subcarrier frequencies to the different frequency patterns, as must be performed in order to achieve that the distribution of the pilot subgrids over the frequency patterns leads for each pilot subgrid to no more than a maximum defined number of pilots that lie within each frequency pattern, and said frequency patterns are allocated to mobile terminals, a base transceiver station comprising means for distributing data on an OFDM time-frequency grid for data transmission to mobile terminals in a mobile network accommodating the use of pilot subgrids suitable for channel estimation, wherein, subcarrier frequencies of different frequency patterns comprised in said OFDM time-frequency grid are interleaved, in at least one interleaving interval, as many cyclic shifts of the respective part of the frequency patterns are performed, rotating the allocation of the subcarrier frequencies to the different frequency patterns, as must be performed in order to achieve that the distribution of the pilot subgrids over the frequency patterns leads for each pilot subgrid to no more than a maximum defined number of pilots that lie within each frequency pattern, and said frequency patterns are allocated to mobile terminals, a base station controller for radio resource management in a mobile network, wherein the base station controller comprises means for allocating the new frequency patterns and/or the other frequency patterns according to claim 3 to the cells of the mobile network and a mobile network comprising mobile terminals, at least one base transceiver station comprising means for distributing data on an OFDM time-frequency grid for data transmission to mobile terminals in a mobile network accommodating the use of pilot subgrids suitable for channel estimation, wherein, subcarrier frequencies of different frequency patterns comprised in said OFDM time-frequency grid are interleaved, in at least one interleaving interval, as many cyclic shifts of the respective part of the frequency patterns are performed, rotating the allocation of the subcarrier frequencies to the different frequency patterns, as must be performed in order to achieve that the distribution of the pilot subgrids over the frequency patterns leads for each pilot subgrid to no more than a maximum defined number of pilots that lie within each frequency pattern, and said frequency patterns are allocated to mobile terminals and at least one base station controller for radio resource management in a mobile network, wherein the base station controller comprises means for allocating the new frequency patterns and/or the other frequency patterns according to claim 3 to the cells of the mobile network.

In the following, the main idea of the invention will be shortly described.

It shall be assumed that N is the total number of subcarrier frequencies in the frequency band. If M is the number of subcarrier frequencies contained in each frequency pattern, J frequency patterns with J·M=N can be constructed. This number J is often a power of 2 to allow efficient signaling of the patterns allocated to a user. Distributing the subcarrier frequencies of each frequency pattern as far apart as possible to achieve maximum frequency diversity results in frequency patterns, whose subcarrier frequencies all lie J subcarriers apart. The placement of all frequency patterns resembles then a simple interleaving arrangement.

These frequency patterns have to be compatible with all pilot subgrids where every p-th subcarrier is a pilot carrier. Ideally, if the number of pilot hits in the different frequency patterns is equally distributed over all frequency patterns, there should be a maximum number of pilot hits MAX per each frequency pattern that can be calculated according to this formula:

$$MAX=ceil(M/p)$$

If the distance J of the subcarrier frequencies in each frequency pattern and the distance p of the pilot subgrid subcarrier frequencies have common prime factors, the problem occurs that some frequency patterns have a lot of pilot hits while others have none.

The main idea of the invention is now to first distribute the subcarrier frequencies of the frequency patterns in the interleaved fashion as before resulting in M interleaving intervals. In each interleaving interval, the subcarrier frequencies belonging to the serially from 0 to J-1 numbered frequency patterns are lined up. Then, in some of the interleaving intervals at least one cyclic shift of the respective part of the numbered frequency patterns is performed rotating the allocation of the subcarrier frequencies to the different frequency patterns inside the interleaving interval. The number of cyclic shifts going from one interleaving interval to another can be kept constant or can be increased or decreased to achieve the goal of maximally ceil(M/p) pilot hits per frequency pattern and thus an evenly distributed pilot overhead on all frequency patterns for all pilot shifts. Thus the frequency patterns are all compatible with the pilot subgrids.

For the different cells of the mobile network now a fixed or negotiated power limitation on a subset of the frequency patterns is in place. The subset is different for the different cells. The users get now allocated frequency patterns according to the interference sources sensed by the corresponding mobile terminals and exploiting the power limitations on interfering frequency patterns from neighbor cells.

Further developments of the invention can be gathered from the dependent claims and the following description.

BRIEF DESCRIPTION OF THE DRAWINGS

In the following the invention will be explained further making reference to the attached drawings.

DETAILED DESCRIPTION OF THE INVENTION

Figure 1:
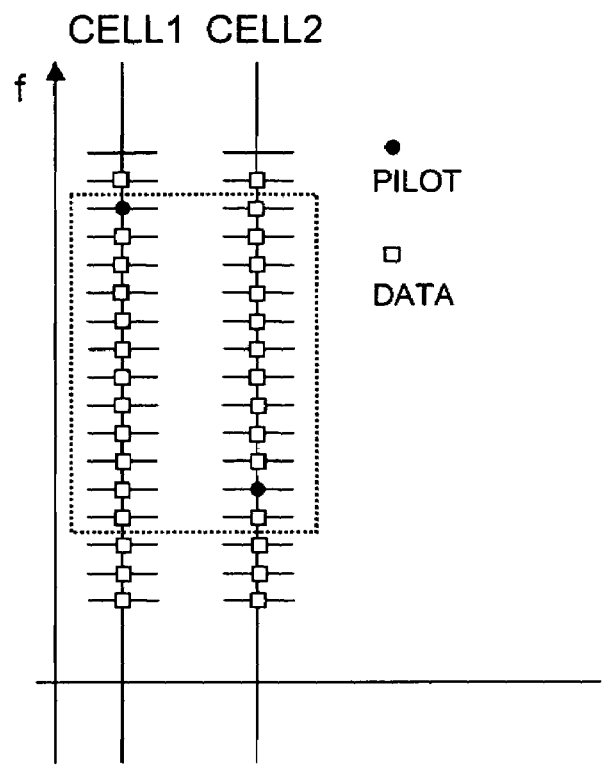
FIG. 1 schematically shows the allocation of the subcarrier frequencies of an OFDM frequency grid to data and pilots for two cells.

A mobile network according to the invention comprises mobile terminals, at least one base transceiver station according to the invention and at least one base station controller according to the invention.

Each of said mobile terminals is connected to one of said at least one base transceiver stations, and each of said at least one base transceiver stations is in turn connected to one of said at least one base station controller.

The mobile terminals comprise the functionality of a mobile terminal for OFDM transmission in a mobile network, i.e. they can be connected to a mobile network by means of a base transceiver station.

A base transceiver station according to the invention comprises the functionality of a base transceiver station of a mobile network, i.e. it provides the possibility for mobile terminals to get connected to the mobile network. Furthermore, the base transceiver station comprises means for distributing data on an OFDM time-frequency grid for data transmission to different mobile terminals in the mobile network accommodating the use of pilot subgrids suitable for channel estimation, with the subcarrier frequencies of different frequency patterns comprised in said OFDM time-frequency grid being interleaved, with at least one cyclic shift of the respective part of the frequency patterns being performed in at least one interleaving interval, rotating the allocation of the subcarrier frequencies to the different frequency patterns, and with the pilot subgrids being distributed over the sets of subcarrier frequency so that for each pilot subgrid no more than a maximum defined number of pilots lie within each frequency pattern.

A base station controller according to the invention comprises the functionality of a base station controller of a mobile network, i.e. it controls the radio resources and performs handover procedures. Furthermore, the base station controller comprises means for allocating sets of frequencies of an OFDM time-frequency grid according to the invention to the cells.

In the following, by way of example the method according to the invention is described in detail making reference to FIGS. 1 to 3.

The method according to the invention is described for an OFDM transmission for UTRAN enhancement using the physical parameter set 2 with 1024 FFT points (FFT=Fast Fourier Transformation). According to the 3GPP TR 25.892 v1 report on page 22, we then have 705 usable subcarrier frequencies to our disposition. If the DC subcarrier frequency is not used in order to avoid problems with offsets of the analog digital converter, there are 704 usable subcarrier frequencies remaining. At the same time, in a Transmission Time Interval (TTI) with a duration of 2 ms, there are 12 OFDM symbols, so that we receive a 2-dimensional field with 704*12 points in a OFDM time-frequency grid as resource. The allocation of this resource in possible time-frequency patterns shall be investigated more closely in the following.

Generally spoken, when using such time-frequency patterns together with pilot subgrids and signaling patterns in a multi-cell system, user multiplexing, channel equalization by means of pilots and signaling to the subscribers have to be assured also in the area of interference of two cells.

The requirement to provide channel equalization by means of the pilots also in the area of interference of two cells leads to the solution, that the pilots must be allocated to different points in the OFDM time-frequency grid for neighboring cells. As pilots have a higher energy than data signals, an equalization is possible even in case of interference between a pilot and a data signal.

If the base transceiver stations within the mobile network are sending in a synchronized manner, then a lot of time-frequency patterns are possible also offering advantages for user multiplexing. However, as synchronization is not provided in the UTRAN standard, there is no use in requiring this feature for OFDM transmission, so that the proposed solution is suitable for unsynchronized base transceiver stations.

To perform user multiplexing, per user, i.e. per mobile terminal, or per data channel a time-frequency pattern is defined out of the remaining resources, so that the various time-frequency patterns are disjoint subsets of the OFDM time-frequency grid. Also in this case, the interferences from different cells have to be taken into account.

In principle, it has to be distinguished, whether spreading of the interferences from one data channel to a multitude of channels in the neighboring cell has to be achieved, or whether a concentration of the interferences to only a small number of channels in the neighboring cell is desired. In case of a desired concentration of the interferences at least for a part of the time-frequency patterns, the pilots of the neighboring cells must be different, but the time-frequency patterns must be the same in the neighboring cells, so that a coordination is possible.

The density in frequency and time of the pilots must be high enough to perform a channel estimation for all channels. Furthermore, the pilot and signaling patterns must fit with the time-frequency patterns, so that the data rate is as high as required and at the same time, there are enough pilot and signaling symbols to signal the user allocation of the time-frequency pattern.

The last criteria for building time-frequency patterns is the requirement that the time-frequency patterns either have to offer frequency diversity for a robust transmission, or have to be frequency selective and choosable for a channel adaptive choice, i.e. assignment of the subcarrier frequencies, and modulation in order to achieve an optimum utilization of the channel capacity e.g. in case of predictable, slowly moving users.

As the base transceiver stations in our example are unsynchronized so that nothing can be said about the temporal relationship of the time-frequency patterns in neighboring cells, and as pilot interferences from neighboring cells have to be avoided, the pilots in neighboring cells must lie on different subcarrier frequencies even at different points in time. To achieve this, the pilot subgrids are chosen not to be time-dependent throughout a whole TTI interval.

Without restricting to this, we assume in our example, that every $12^{th}$ subcarrier frequency is a pilot or alternating a pilot and a signaling carrier, which are combined for the sake of simplicity in the following and both called pilots. These pilots have an effective frequency distance of 12 in the grid of subcarrier frequencies and there are about as much pilot carriers as signaling carriers.

The numbering of the subcarrier frequencies for the allocation to the different frequency patterns is done in such a way, that the DC subcarrier is not used for the above mentioned reasons and that the remaining 704 usable subcarrier frequencies are numbered from 0 to 703, which leads to a higher frequency distance between the subcarrier frequencies 351 and 352. This means, that the distance of the pilots around the DC subcarrier is somewhat larger, which is however acceptable for channel estimation. As a result, we get 12 pilot subgrids characterized by the position of the lowest pilot subcarrier frequency which lies between 0 and 11.

Having found the possible pilot subgrids, we can deduce out of the general requirements mentioned above conditions for the user multiplexing patterns, i.e. the different time-frequency patterns.

With a pilot distance of 12, there are either 59 or 58 pilots per OFDM symbol, so that a minimum of 645 usable subcarrier frequencies remain. 640 subcarrier frequencies offer a capacity of 12*640=7680 QAM symbols (QAM=Quadrature Amplitude Modulation). As a code in CDMA systems with a spreading factor of 16 has a capacity of 480 QAM symbols in a TTI interval of 2 ms, 16 codes with a spreading factor of 16 can be accommodated. The capacity of a time-frequency pattern corresponding to a code with a spreading factor of 16 is therefore 640/16=40 subcarrier frequencies per OFDM symbol.

To achieve the aim of interference spreading from one data channel to a multitude of channels in the neighboring cell, one could use together with shifted pilot subgrids also shifted user multiplexing patterns in different cells. However, as we want to achieve concentration of the interferences at least for a part of the time-frequency patterns, i.e. the user multiplexing patterns, these time-frequency patterns must be the same in the neighboring cells, so that a coordination is possible. In this case an interference spreading can nevertheless be achieved by putting these time-frequency patterns in different cells differently together to get new time-frequency patterns.

In principle, to achieve concentration of the interferences, the user multiplexing patterns can not be time-dependent, as the base transceiver stations are not synchronized, so that the identity of time-dependent user multiplexing patterns in different cells can not be guaranteed. That means, that the time-frequency patterns become simple frequency patterns that are used throughout a whole TTI interval.

As already mentioned, to achieve concentration of the interferences, the frequency patterns in neighboring cells must be the same although the pilot subgrids being different. This means, that each frequency pattern must comprise so many subcarrier frequencies, that after subtraction of the pilots that lie within the frequency patterns, enough subcarrier frequencies remain to allow for data transmission with the required data rate.

In FIG. 1, the OFDM frequency grid for two neighboring cells CELL1 and CELL2 is depicted along the frequency axis f. The position of the subcarrier frequencies in the OFDM frequency grid is indicated by short equidistant lines. Subcarrier frequencies that are indicated with circles signify, that they are used for pilots, i.e. they can not be used for data transmission. Subcarrier frequencies that are indicated with rectangles are used for data transmission. The subcarrier frequencies within the dotted frame belong to the same frequency pattern, i.e. to the same user multiplexing pattern. As can be seen, this frequency pattern is the same for both cells as required above, but the pilot subcarrier frequencies are different.

As the subcarrier frequencies that are used for pilots can not be used for data transmission, there must remain enough subcarrier frequencies for data transmission for every position of the pilot subgrid in the OFDM frequency grid.

As a consequence, frequency patterns have to be found, that fit together with the pilot subgrid having a pilot distance of 12 and that allow for concentration of interferences.

In the example, without restriction, the frequency patterns shall provide the capacity to transport 120 QAM symbols in a TTI interval and each frequency pattern shall possess frequency diversity. That means, that every frequency pattern comprises 11 subcarrier frequencies that must be distributed as equally as possible over the OFDM frequency grid. The easiest way to achieve this, is to arrange the 11 subcarrier frequencies of a frequency pattern with a distance of 64 in the OFDM frequency grid, so that 64 comb-like interleaved frequency patterns are received that cover the whole OFDM frequency grid of usable subcarrier frequencies, as 64*11=704.

Figure 2:
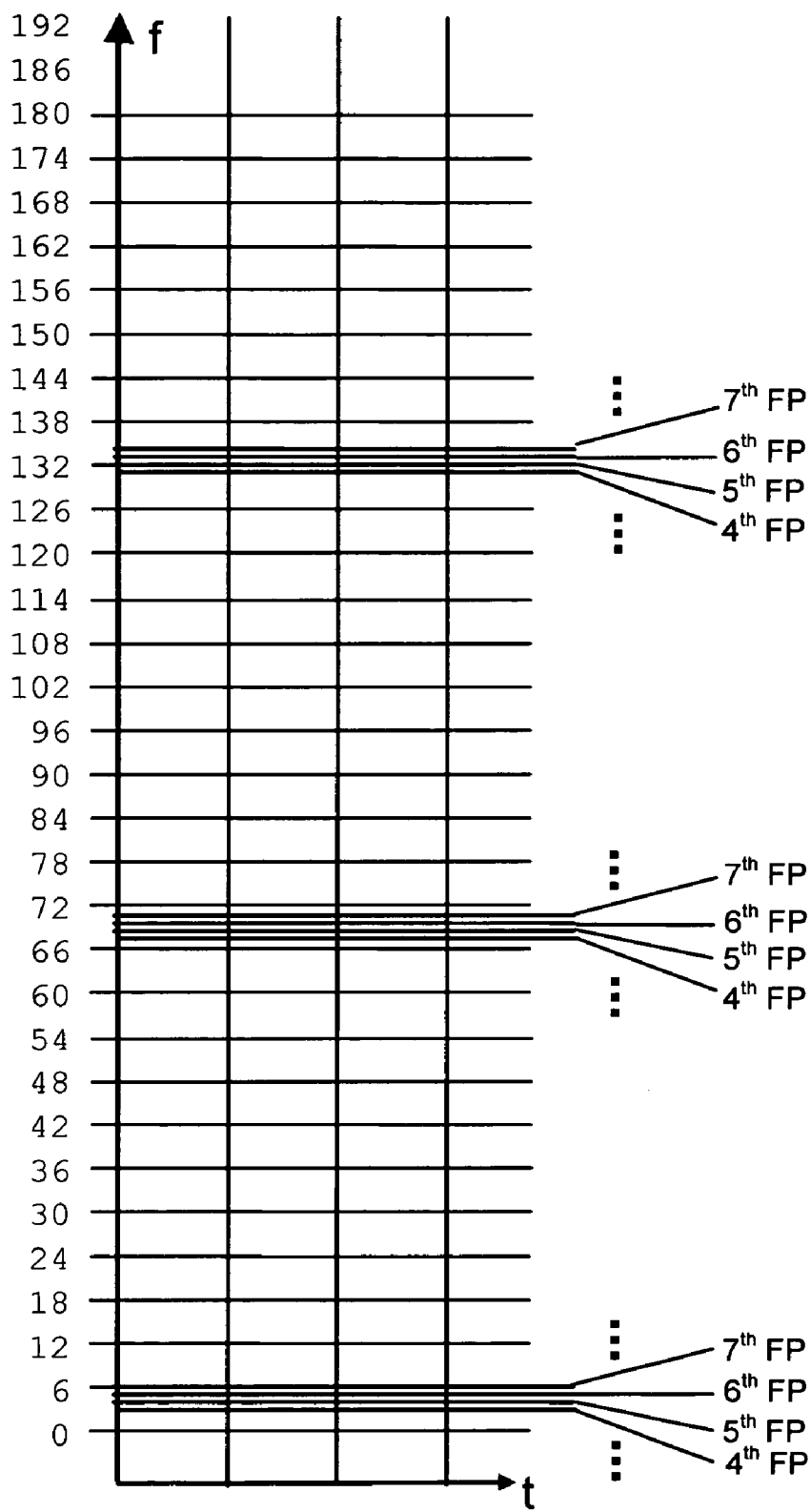
FIG. 2 schematically shows the allocation of the subcarrier frequencies of an OFDM time-frequency grid to different frequency patterns used for carrying out a method for distributing data on this OFDM time-frequency grid according to the invention.

In FIG. 2, the above mentioned frequency patterns are shown. The OFDM frequency grid is depicted along the frequency axis f, and the position of the subcarrier frequencies in the OFDM frequency grid is indicated by numbers. The periodically returning position along the frequency axis of the subcarrier frequencies of the $4^{th}$ to $7^{th}$ frequency pattern $4^{th}$ FP to $7^{th}$ FP is depicted for the first three interleaving intervals. The first subcarrier frequency of the first frequency pattern lies at the position 0, the second subcarrier frequency of the first frequency pattern lies at the position 64 and so on. The first subcarrier frequency of the second frequency pattern lies at the position 1, the second subcarrier frequency of the second frequency pattern lies at the position 65 and so on.

The requirement of compatibility with the pilot subgrid means, that in each frequency pattern, at most one pilot is allowed, so that at least 10 subcarrier frequencies remain for data transmission of 10*12=120 QAM symbols in a TTI interval. However, this requirement is in contrast with the above described simple arrangement, as already the first frequency pattern has three pilots and is therefore useless.

Thus, the frequency patterns have to be modified to meet this requirement. This is done by means of a cyclic shift of the frequency patterns from the $3^{rd}$ interleaving interval on, by means of two cyclic shifts of the frequency patterns from the $6^{th}$ interleaving interval on and by means of three cyclic shifts of the frequency patterns from the $9^{th}$ interleaving interval on.

Figure 3:
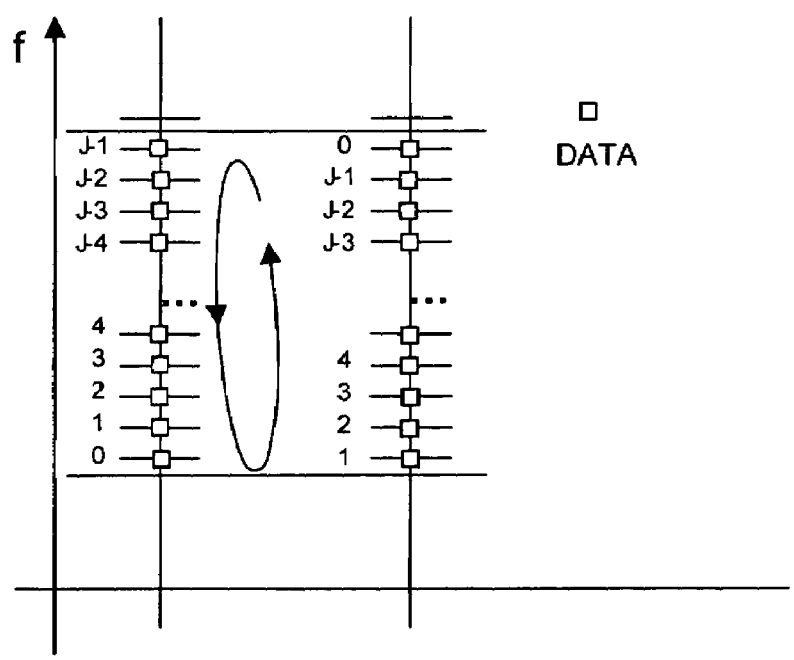
FIG. 3 schematically shows the rotation of the allocation of the subcarrier frequencies to the different frequency patterns inside one interleaving interval used for carrying out a method for distributing data on this OFDM frequency grid according to the invention.

In FIG. 3, the allocation of the subcarrier frequencies to the frequency patterns before and after such a cyclic shift is shown. The OFDM frequency grid is depicted along the frequency axis f, and the position of the subcarrier frequencies in the OFDM frequency grid are indicated by rectangles. The different frequency patterns are numbered from 0 to J-1, which is in our example 63. On the left side, the interleaving interval before a cyclic shift is depicted. The number of the frequency pattern is increasing from 0 to J-1, which is 63, with increasing frequency. On the right side, the allocation of the subcarrier frequencies to the frequency patterns after such a cyclic shift is shown. The lowest subcarrier frequency is now allocated to the frequency pattern indicated with 1, the second-lowest subcarrier frequency is now allocated to the frequency pattern indicated with 2 and so on. The highest subcarrier frequency of the interleaving interval is now allocated to the frequency pattern indicated with 0.

For every pilot subgrid with a distance of 12 in the OFDM frequency grid, all frequency patterns have at most 1 pilot among the 11 subcarrier frequencies as will be shown in the following.

Every frequency pattern A is described by its subcarrier frequency positions K, i.e. by the set $K=\{k_0, \ldots, k_{10}\}$. It is characterized uniquely by the starting position of the first subcarrier frequency $k_0 \in \{0, \ldots, 63\}$. Thus, a frequency pattern can be indicated by $A(k_0)$. If n is the number of the interleaving interval, with n∈{0,1,2, ..., 10}, then the subcarrier frequency positions $A(k_0)$ are given by the following formula:

$$k_n = n \cdot 64 + \left\{ \begin{array}{l} k_0 - \left\lfloor \frac{n+1}{3} \right\rfloor \\ 64 + k_0 - \left\lfloor \frac{n+1}{3} \right\rfloor \quad \text{if } k_0 - \left\lfloor \frac{n+1}{3} \right\rfloor < 0 \end{array} \right\}$$

To find out whether pilots lie in the frequency pattern, the subcarrier frequency positions have to be calculated modulo 12. This value indicates, how far the periodic pilot subgrid has to be shifted from the origin to have the pilot lying on the subcarrier frequency position. From this follows, that all subcarrier frequency positions modulo 12 shall be spreaded over the range 0 to 11 and no value shall appear two times. Otherwise, a shift of the pilot subgrid would lead to two or more pilots lying in one frequency pattern. On the other hand, if each value appears only once, it is shown that every shift of the pilot subgrid leads to at most one pilot lying in one frequency pattern, which is the required attribute.

Thus, the modulo operation for the subcarrier frequency positions is performed. As can be received from the formula for the subcarrier frequency positions for the starting position $k_0=0$, the subcarrier frequency positions $k_0$ to $k_{10}$ are (0, 64, 191, 255, 319, 382, 446, 510, 573, 637, 701). To obtain the modulo values, the modulo operation can be distributed to the summands:

$k_n \bmod 12 =$ $$\left( n \cdot 4 + k_0 \bmod 12 + \left\{ \begin{array}{l} \left(-\left\lfloor \frac{n+1}{3} \right\rfloor\right) \bmod 12 \\ 4 + \left(-\left\lfloor \frac{n+1}{3} \right\rfloor\right) \bmod 12 \quad \text{if } k_0 - \left\lfloor \frac{n+1}{3} \right\rfloor < 0 \end{array} \right\} \right) \bmod 12$$

Thus we receive $k_n \bmod 12 = (0, 4, 11, 3, 7, 10, 2, 6, 9, 1, 5)$.

For $k_0=0$ the value 8 does not appear and every other value appears only once. That means that there is at most one pilot in the first frequency pattern. Now, this modulo operation has to be performed for the other frequency patterns.

For $k_0=1$, we receive $k_n=(1, 65, 128, 192, 256, 383, 447, 511, 574, 638, 702)$ and $k_n \bmod 12 = (1, 5, 8, 0, 4, 11, 3, 7, 10, 2, 6)$.

For $k_0=2$, we receive $k_n=(2, 66, 129, 193, 257, 320, 384, 448, 575, 639, 703)$ and $k_n \bmod 12 = (2, 6, 9, 1, 5, 8, 0, 4, 11, 3, 7)$.

Also in these cases, at most one pilot is in the frequency patterns, as can be seen from the values.

For $k_0=3$ and higher values of $k_0$, in the formula for the calculation of the subcarrier frequency positions, the exceptional case does not appear any more, and these positions are determined in the following way:

$$k_n = k_0 + n \cdot 64 - \left\lfloor \frac{n+1}{3} \right\rfloor \quad \text{for } k_0 \geq 3.$$

All frequency patterns are then received by means of a simple frequency shift as given by the starting position of the first subcarrier frequency $k_0$. As the number of pilots does not depend upon shifts, it is sufficient to check the first representative frequency pattern for $k_0=3$.

For $k_0=3$, we receive $k_n=(3, 67, 130, 194, 258, 321, 385, 449, 512, 576, 640)$ and $k_n \bmod 12 = (3, 7, 10, 2, 6, 9, 1, 5, 8, 0, 4)$.

Also in this case, at most one pilot is in the frequency patterns, and thus, this is also the case for all shifted frequency patterns with $4 \leq k_0 \leq 63$.

In consequence, it has been shown that in all frequency patterns, there is at most one pilot, so that the requirement of compatibility with the pilot subgrid mentioned above is given.

Each single one of these frequency patterns offers frequency diversity, and the frequency patterns can be the same in all cells.

The above mentioned procedure to receive frequency patterns can be applied for various periodicities of the pilot subgrid, for various periodicities of the interleaving interval, i.e. for various numbers of frequency patterns, for various maximum numbers of pilots that are allowed in a frequency pattern and for various bandwidths of the OFDM frequency grid. In other words, in at least one interleaving interval, at least one cyclic shift of the frequency patterns is performed. This is done repeatedly till no more than a maximum number of pilots lie within each frequency pattern, which is verified by the above mentioned procedure.

The mentioned procedure is also not restricted to frequency patterns that comprise single subcarrier frequencies in each interleaving interval. A frequency pattern can also comprise Q blocks of L (e.g. L=2 or L=4) adjacent subcarrier frequencies where the blocks of the frequency patterns lie interleaved as in FIG. 2. Then the same principle of rotating the allocation can be applied in at least one interleaving interval.

A base transceiver station according to the invention allocates these frequency patterns to mobile terminals for communication with these mobile terminals, i.e. the data are distributed on the OFDM frequency grid.

In a preferred embodiment, a number of in at least two cells of the mobile network (pseudo-)randomly chosen frequency patterns are put together in the said at least two cells of the mobile network to some new frequency patterns. These new frequency patterns are used in the said at least two cells to achieve spreading of interference over several cells and/or the other frequency patterns are used to achieve coordination of interference between the cells. For example, the frequency patterns with the indices 8 to 63 can be pseudo-randomly permutated in each cell and each TTI interval and put together in 14 groups each comprising 4 frequency patterns, which leads to a pretty good spreading of interference over the cells. The frequency patterns with the indices 0 to 7, which are not permutated, can be used for coordination of interference between the cells.

In a preferred embodiment, a base station controller according to the invention allocates the new frequency patterns and/or the other frequency patterns to the cells.

The invention claimed is:

1. A method for data transmission from and to mobile terminals in a mobile network, the method comprising:
   distributing data on an OFDM time-frequency grid for transmission from and to mobile terminals in a mobile network, said OFDM time-frequency grid comprising different frequency patterns allocated to mobile terminals, with subcarrier frequencies of said different frequency patterns being interleaved; and
   in at least one interleaving interval, performing at least one cyclic shift of the frequency patterns to rotate the allocation of the subcarrier frequencies such that a distribution of pilot subgrids over the frequency patterns includes no more than a maximum defined number of pilots within each frequency pattern;

wherein the maximum defined number of pilots within each frequency pattern the smallest integer that is larger than or equal to the number of subcarrier frequencies contained in each frequency pattern divided by the number of steps that lie between two adjacent pilots.

2. A method according to claim 1, further comprising creating new frequency patterns by putting together a number of pseudo-randomly chosen frequency patterns in at least two cells of the mobile network.

3. A method according to claim 2, further comprising using the new frequency patterns at least two cells of the mobile network to achieve spreading of interference over several cells of the mobile network and/or to achieve coordination of interference between cells of the mobile network.

4. A method according to claim 1, wherein performing at least one cyclic shift of the frequency patters is done repeatedly till no more than a maximum number of pilots lie within each frequency pattern.

5. A method according to claim 1, wherein the frequency patterns comprise an integer number Q blocks individually comprising an integer number L adjacent subcarrier frequencies, where the blocks of the frequency patterns are interleaved, where Q is greater than 1, and where L is 2 or 4.

6. A base transceiver station comprising:
means for distributing data on an OFDM time-frequency grid for data transmission to mobile terminals in a mobile network accommodating the use of pilot subgrids suitable for channel estimation, wherein, subcarrier frequencies of different frequency patterns comprised in said OFDM time-frequency grid are interleaved;
means for performing at least one cyclic shift of the frequency patterns to rotate the allocation of the subcarrier frequencies to the different frequency patterns in at least one interleaving interval such that a distribution of pilot subgrids over the frequency patterns includes no more than a maximum defined number of pilots within each frequency pattern; and
means for allocating said frequency patterns to mobile terminals;
wherein the maximum defined number of pilots within each frequency pattern is the smallest integer that is larger than or equal to the number of subcarrier frequencies contained in each frequency pattern divided by the number of steps that lie between two adjacent pilots.

7. A base transceiver station according to claim 6, wherein the means for performing at least one cyclic shift of the frequency patters performs at least one cyclic shift of the frequency patterns repeatedly till no more than a maximum number of pilots lie within each frequency pattern.

8. A base transceiver station according to claim 6, wherein the frequency patterns comprise an integer number Q blocks individually comprising an integer number L adjacent subcarrier frequencies, where the blocks of the frequency patterns are interleaved, where Q is greater than 1, and where L is 2 or 4.

9. A base station controller for radio resource management in a mobile network, comprising:
means for distributing data on an OFDM time-frequency grid for transmission from and to mobile terminals in a mobile network, said OFDM time-frequency grid comprising different frequency patterns, with subcarrier frequencies of said different frequency patterns being interleaved;
means for performing at least one cyclic shift of the frequency patterns to rotate the allocation of the subcarrier frequencies in at least one interleaving interval such that a distribution of pilot subgrids over the frequency patterns includes no more than a maximum defined number of pilots within each frequency pattern;
means for creating new frequency patterns by putting together a number of pseudo-randomly chosen frequency patterns in at least two cells of the mobile network; and
means for allocating the new frequency patterns and/or the other frequency patterns to the cells of the mobile network;
wherein the maximum defined number of pilots within each frequency pattern is the smallest integer that is larger than or equal to the number of subcarrier frequencies contained in each frequency pattern divided by the number of steps that lie between two adjacent pilots.

10. A base station controller according to claim 9, wherein the means for performing at least one cyclic shift of the frequency patters performs at least one cyclic shift of the frequency patterns repeatedly till no more than a maximum number of pilots lie within each frequency pattern.

11. A base station controller according to claim 9, wherein the frequency patterns comprise an integer number Q blocks individually comprising an integer number L adjacent subcarrier frequencies, where the blocks of the frequency patterns are interleaved, where Q is greater than 1, and where L is 2 or 4.

12. A mobile network comprising:
at least one base transceiver station comprising means for distributing data on an OFDM time-frequency grid for data transmission to mobile terminals in a mobile network accommodating the use of pilot subgrids suitable for channel estimation, said OFDM time-frequency grid comprising different frequency patterns, with subcarrier frequencies of said different frequency patterns being interleaved;
means for performing at least one cyclic shift of the frequency patterns to rotate the allocation of the subcarrier frequencies to the different frequency patterns in at least one interleaving interval such that a distribution of pilot subgrids over the frequency patterns includes no more than a maximum defined number of pilots within each frequency pattern;
means for allocating said frequency patterns to mobile terminals; and
at least one base station controller comprising means for allocating the new frequency patterns and/or the other frequency patterns to the cells of the mobile network;
wherein the maximum defined number of pilots within each frequency pattern is the smallest integer that is larger than or equal to the number of subcarrier frequencies contained in each frequency pattern divided by the number of steps that lie between two adjacent pilots.

13. A mobile network according to claim 12, wherein the means for performing at least one cyclic shift of the frequency patters performs at least one cyclic shift of the frequency patterns repeatedly till no more than a maximum number of pilots lie within each frequency pattern.

14. A mobile network according to claim 12, wherein the frequency patterns comprise an integer number Q blocks individually comprising an integer number L adjacent subcarrier frequencies, where the blocks of the frequency patterns are interleaved, where Q is greater than 1, and where L is 2 or 4.

* * * * *

UNITED STATES PATENT AND TRADEMARK OFFICE
CERTIFICATE OF CORRECTION

PATENT NO. : 7,593,316 B2
APPLICATION NO. : 11/356165
DATED : September 22, 2009
INVENTOR(S) : Christian Georg Gerlach Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Twenty-first Day of September, 2010

David J. Kappos
*Director of the United States Patent and Trademark Office*